United States Patent
Carroll et al.

(10) Patent No.: US 8,376,703 B2
(45) Date of Patent: Feb. 19, 2013

(54) BLADE EXTENSION FOR ROTOR BLADE IN WIND TURBINE

(75) Inventors: Christian A. Carroll, Simpsonville, SC (US); Stefan Herr, Greenville, SC (US); Aaron Yarbrough, Clemson, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/300,868

(22) Filed: Nov. 21, 2011

(65) Prior Publication Data

US 2012/0134815 A1 May 31, 2012

(51) Int. Cl.
*F03D 1/06* (2006.01)

(52) U.S. Cl. .......................... 416/23; 416/239

(58) Field of Classification Search .............. 416/23, 416/24, 62, 228, 239, 231 B
See application file for complete search history.

(56) References Cited

U.S. PATENT DOCUMENTS

| | | | |
|---|---|---|---|
| 2,126,813 A | * | 8/1938 | Reid .............................. 416/23 |
| 7,604,461 B2 | | 10/2009 | Bonnet |
| 2007/0025858 A1 | * | 2/2007 | Driver et al. .............. 416/229 R |
| 2008/0166235 A1 | | 7/2008 | Standish et al. |
| 2010/0028161 A1 | | 2/2010 | Vronsky et al. |

FOREIGN PATENT DOCUMENTS

| | | | | |
|---|---|---|---|---|
| GB | 2464163 A | * | 4/2010 | |
| JP | 2007138753 A | * | 6/2007 | |
| JP | 2008180204 A | * | 8/2008 | |
| JP | 2009197700 A | * | 9/2009 | |

OTHER PUBLICATIONS

Co-pending and commonly assigned U.S. Appl. No. 13/112,148, filed May 20, 2011.

* cited by examiner

*Primary Examiner* — Richard Edgar
(74) *Attorney, Agent, or Firm* — Dority & Manning, P.A.

(57) ABSTRACT

A blade extension for a rotor blade and a rotor blade assembly for a wind turbine are disclosed. The rotor blade assembly includes a rotor blade having exterior surfaces defining a pressure side, a suction side, a leading edge, and a trailing edge each extending in a generally span-wise direction between a tip and a root. The rotor blade assembly further includes a blade extension including a first panel and an opposed second panel. Each of the first panel and the second panel includes an interior surface and an exterior surface each extending between a proximal end and a distal end. The distal end of each of the first panel and the second panel is spaced apart from the rotor blade in a generally chord-wise direction in a standard operation position.

18 Claims, 11 Drawing Sheets

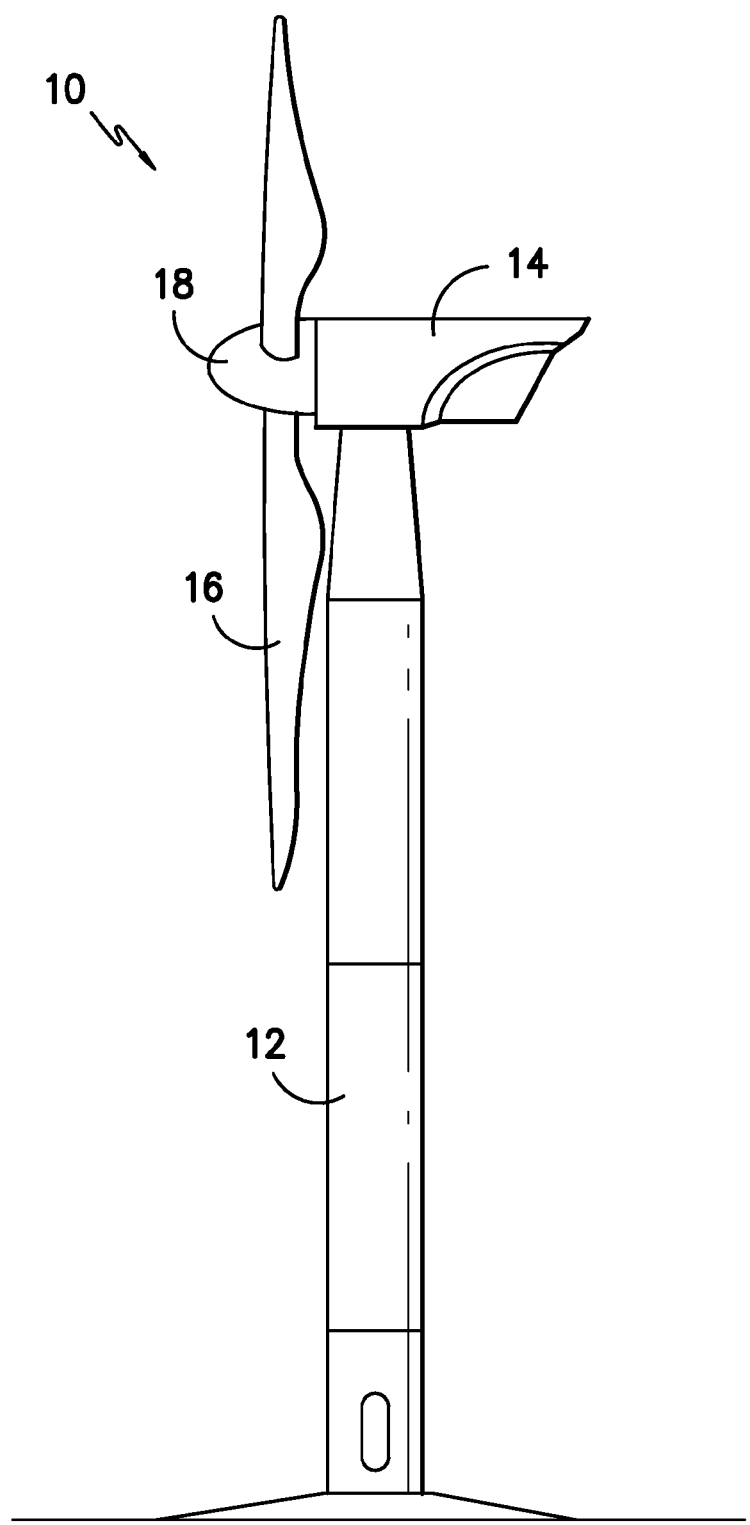
FIG. -1-
PRIOR ART

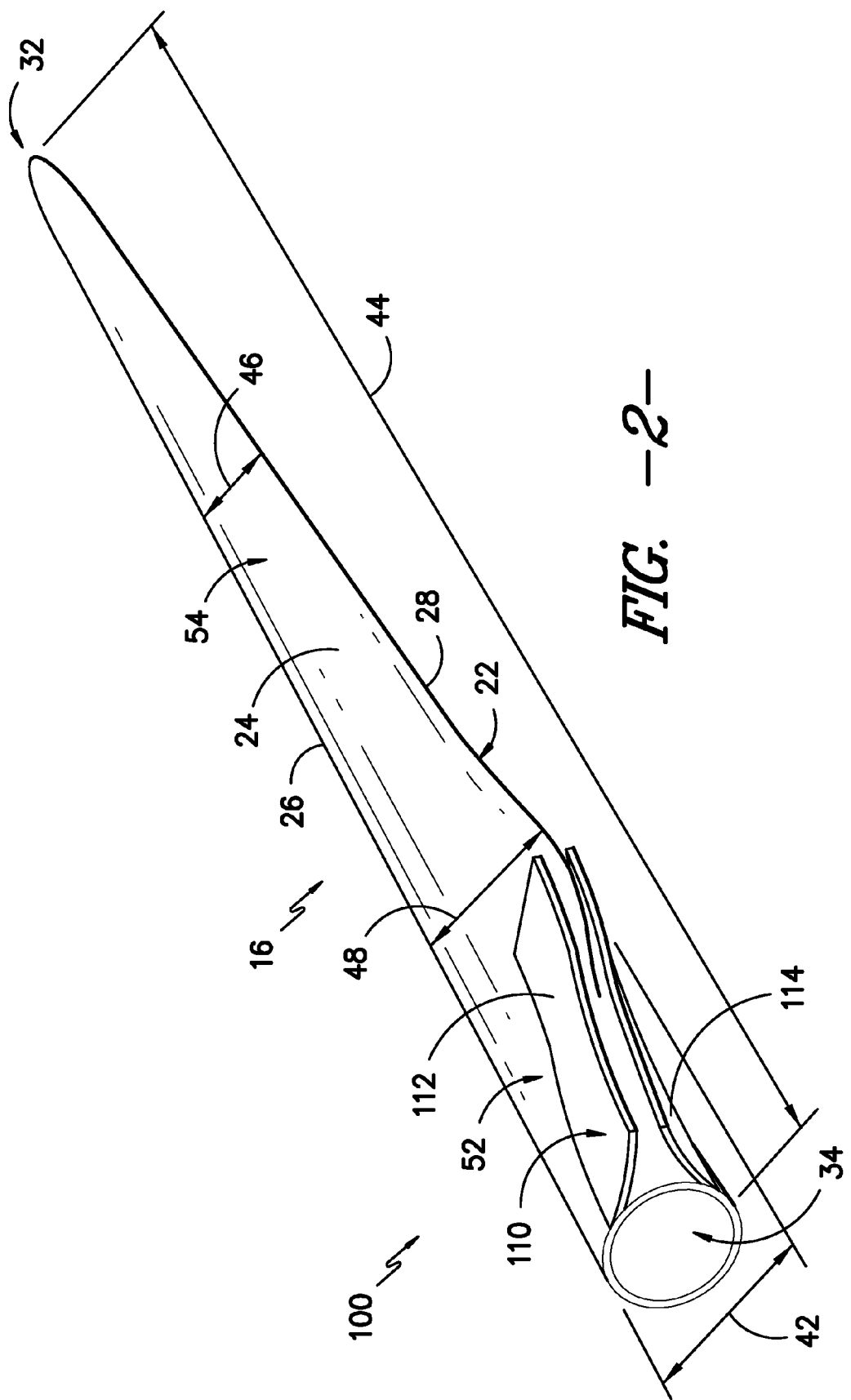
FIG. -2-

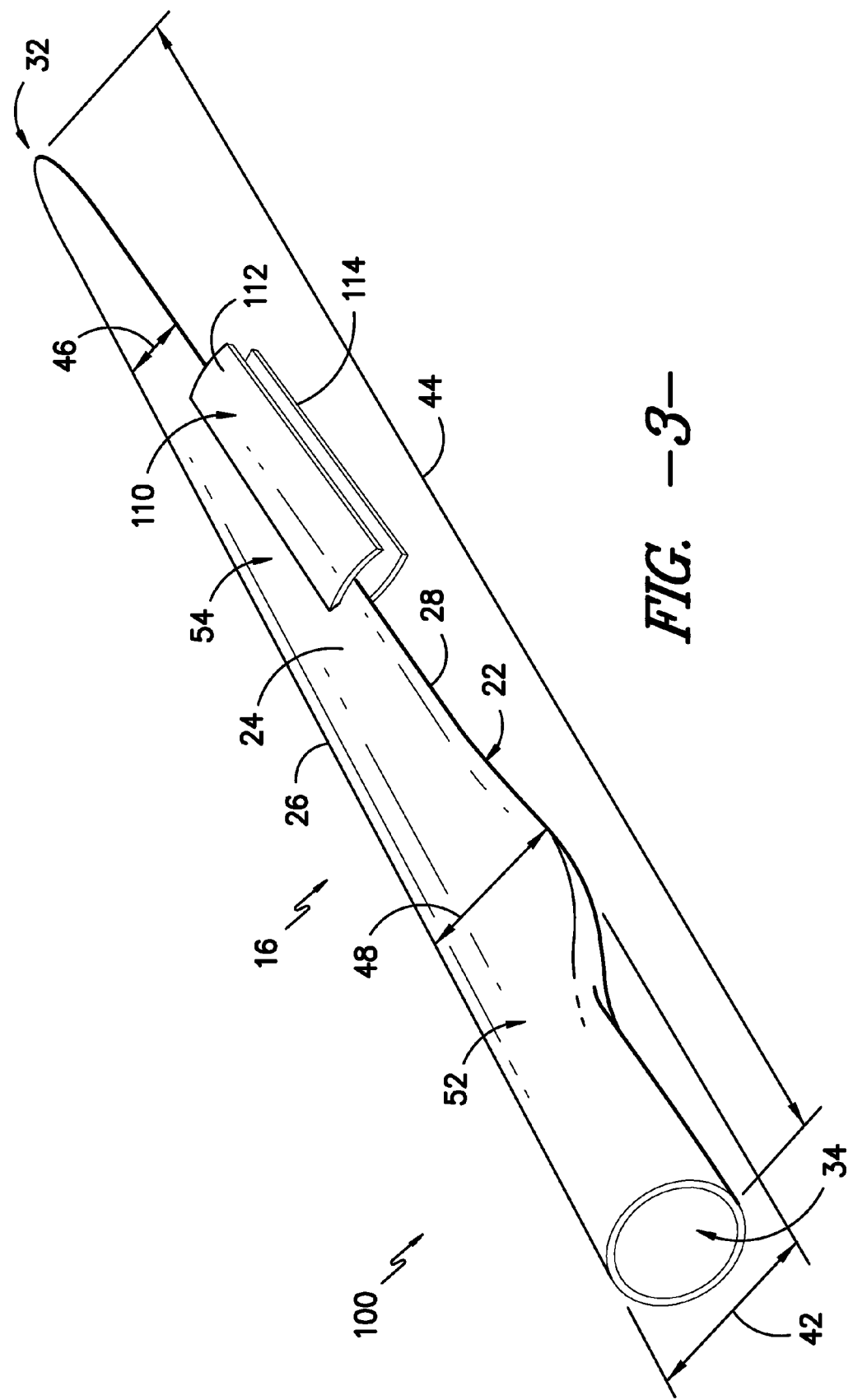
FIG. -3-

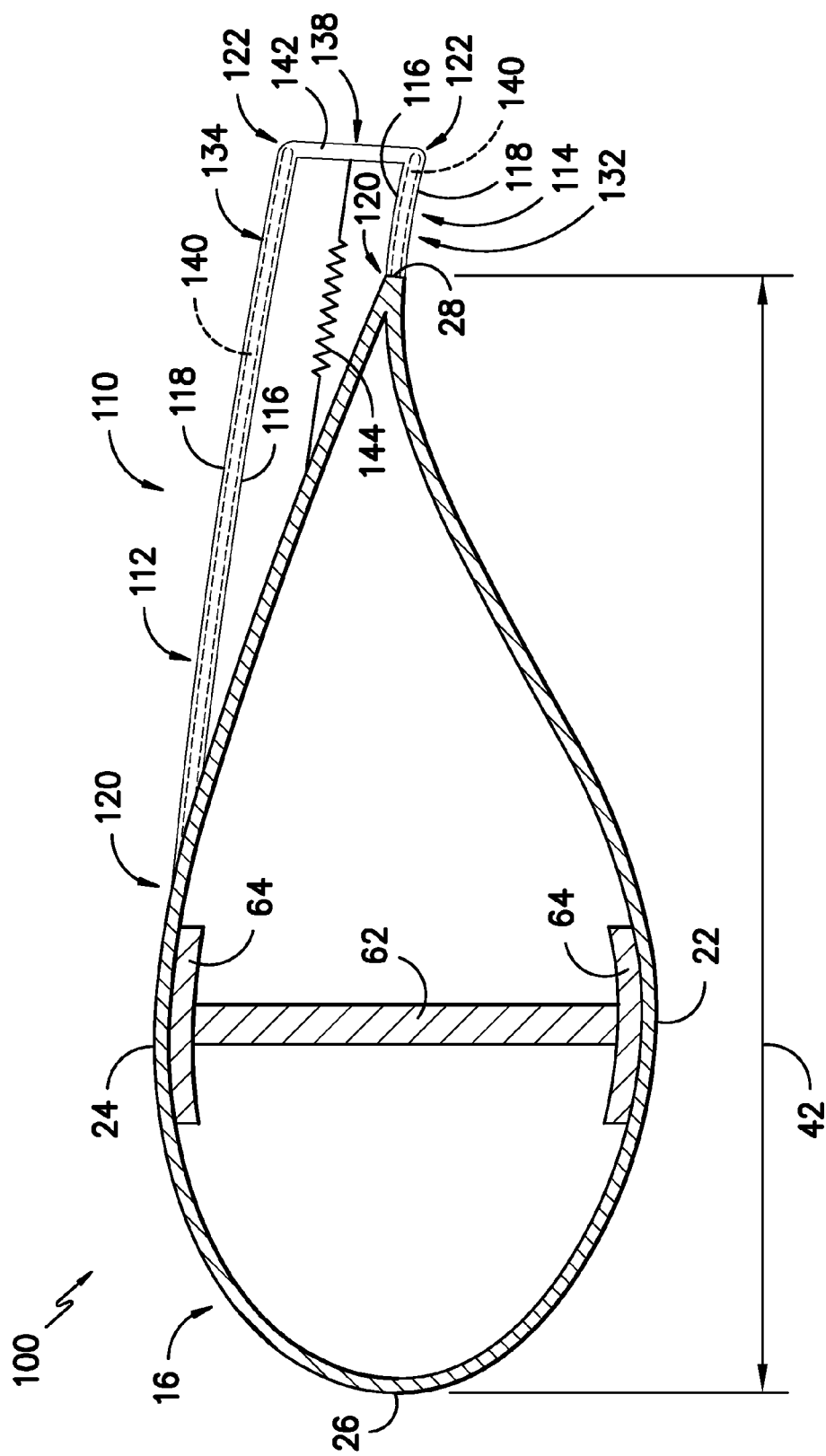
FIG. -4-

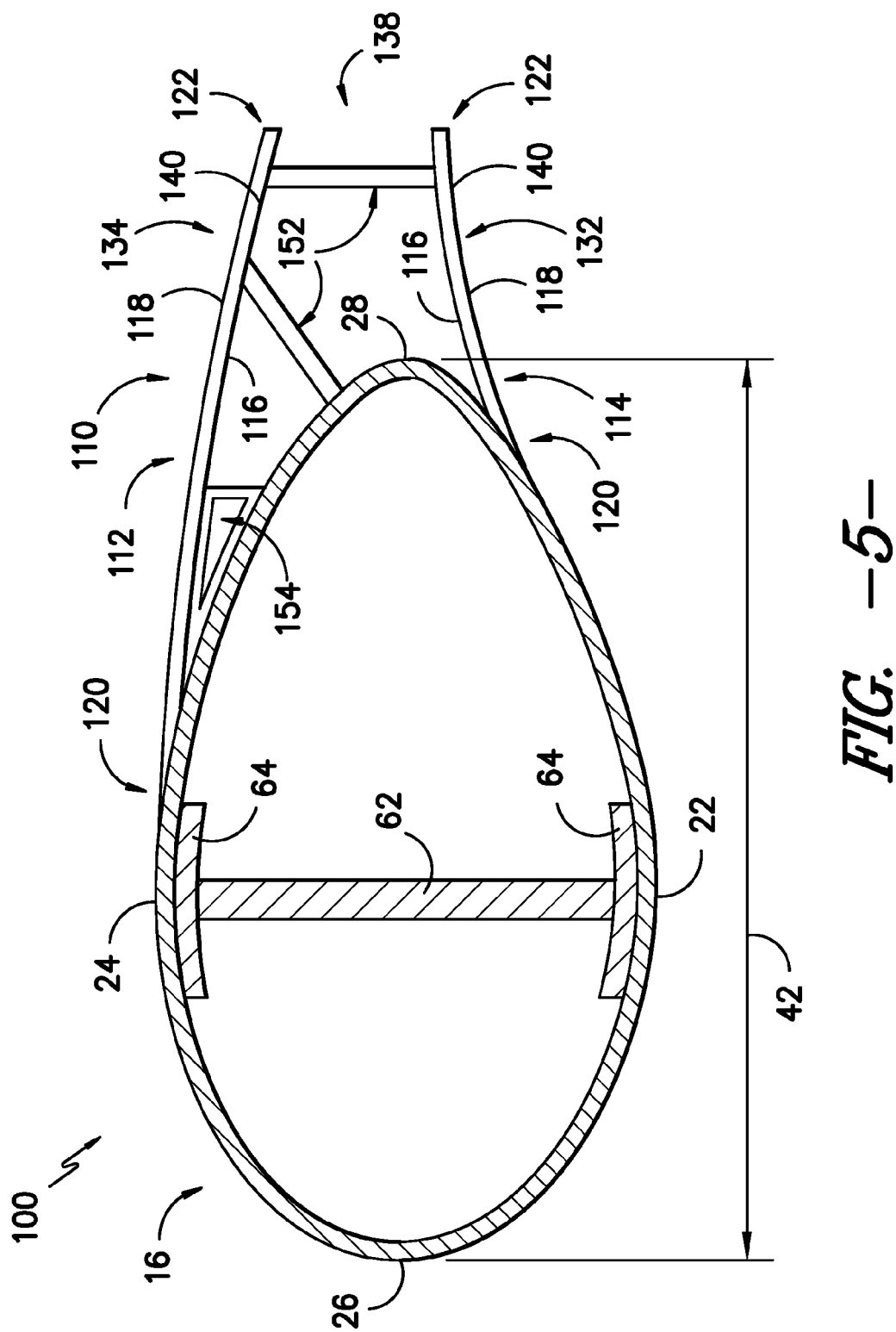
FIG. -5-

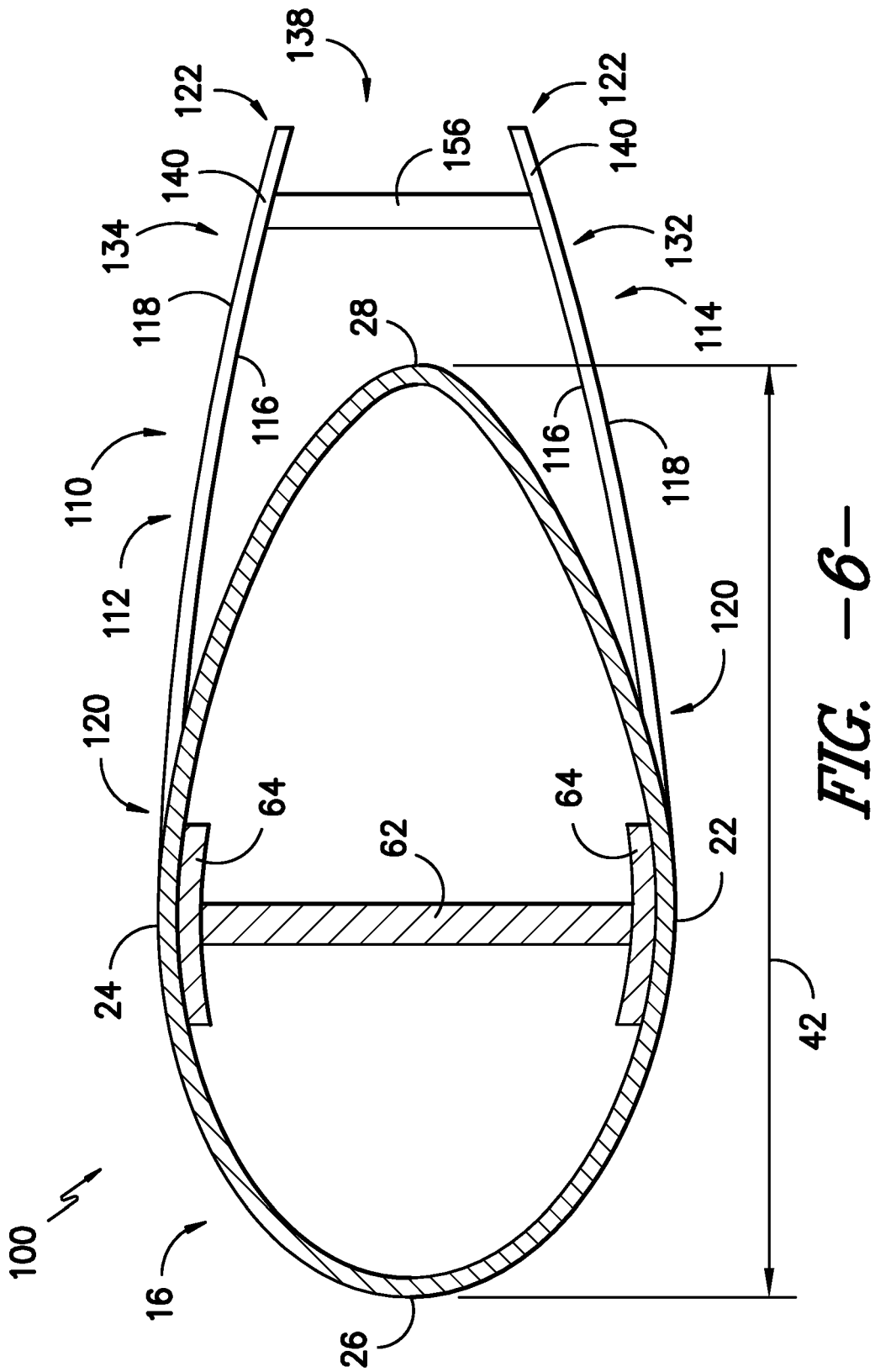
FIG. -6-

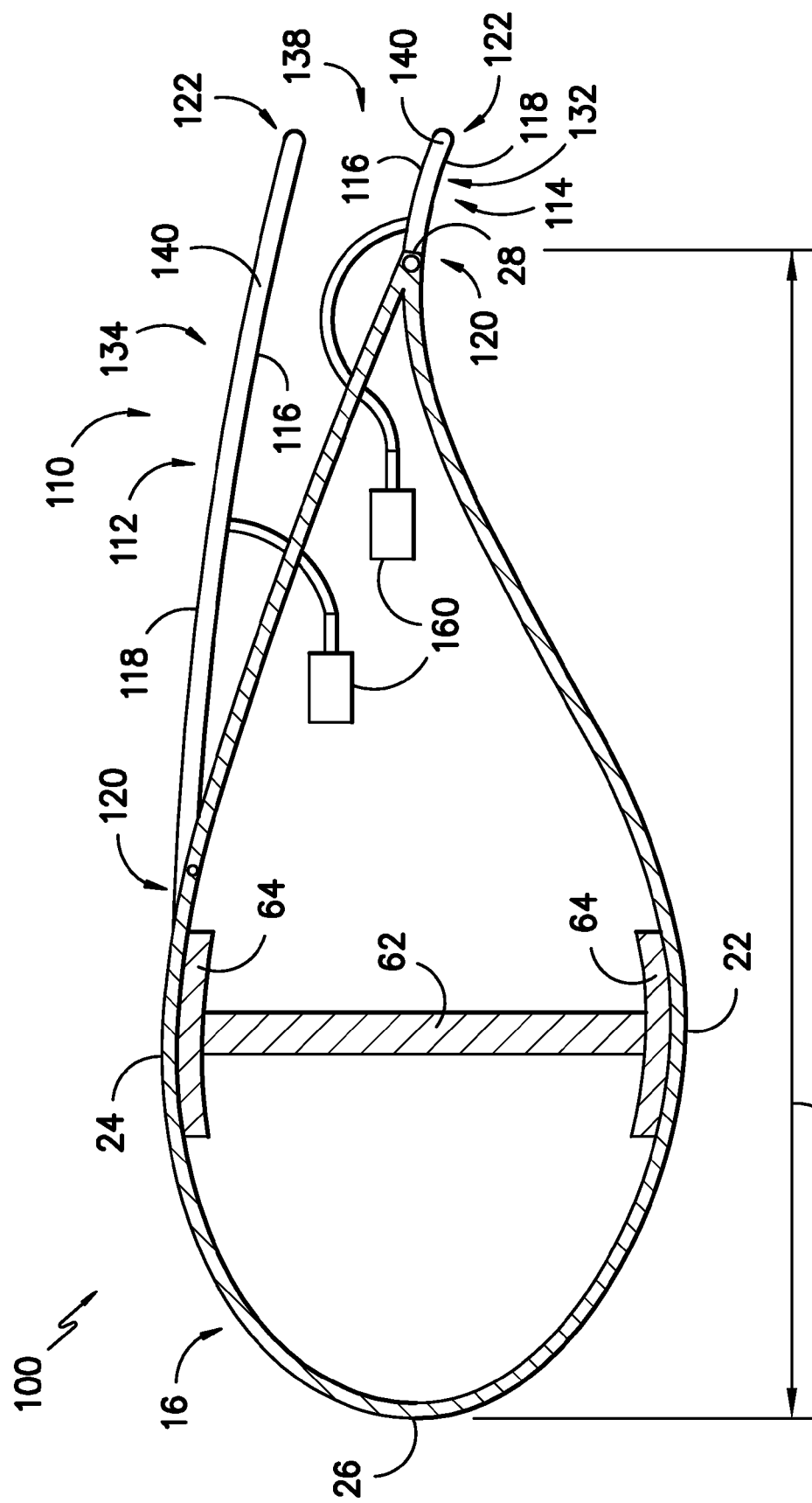
FIG. -7-

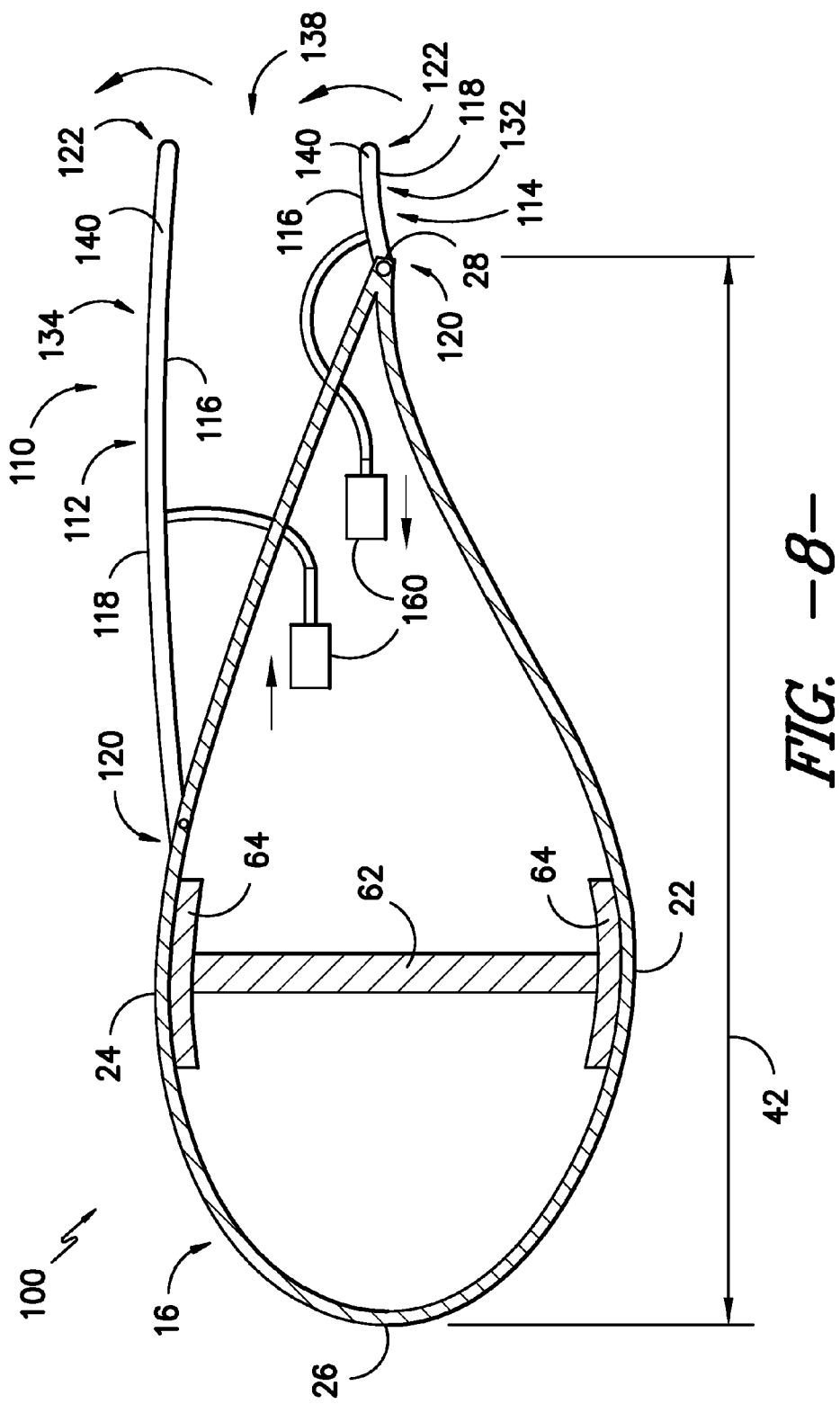
FIG. -8-

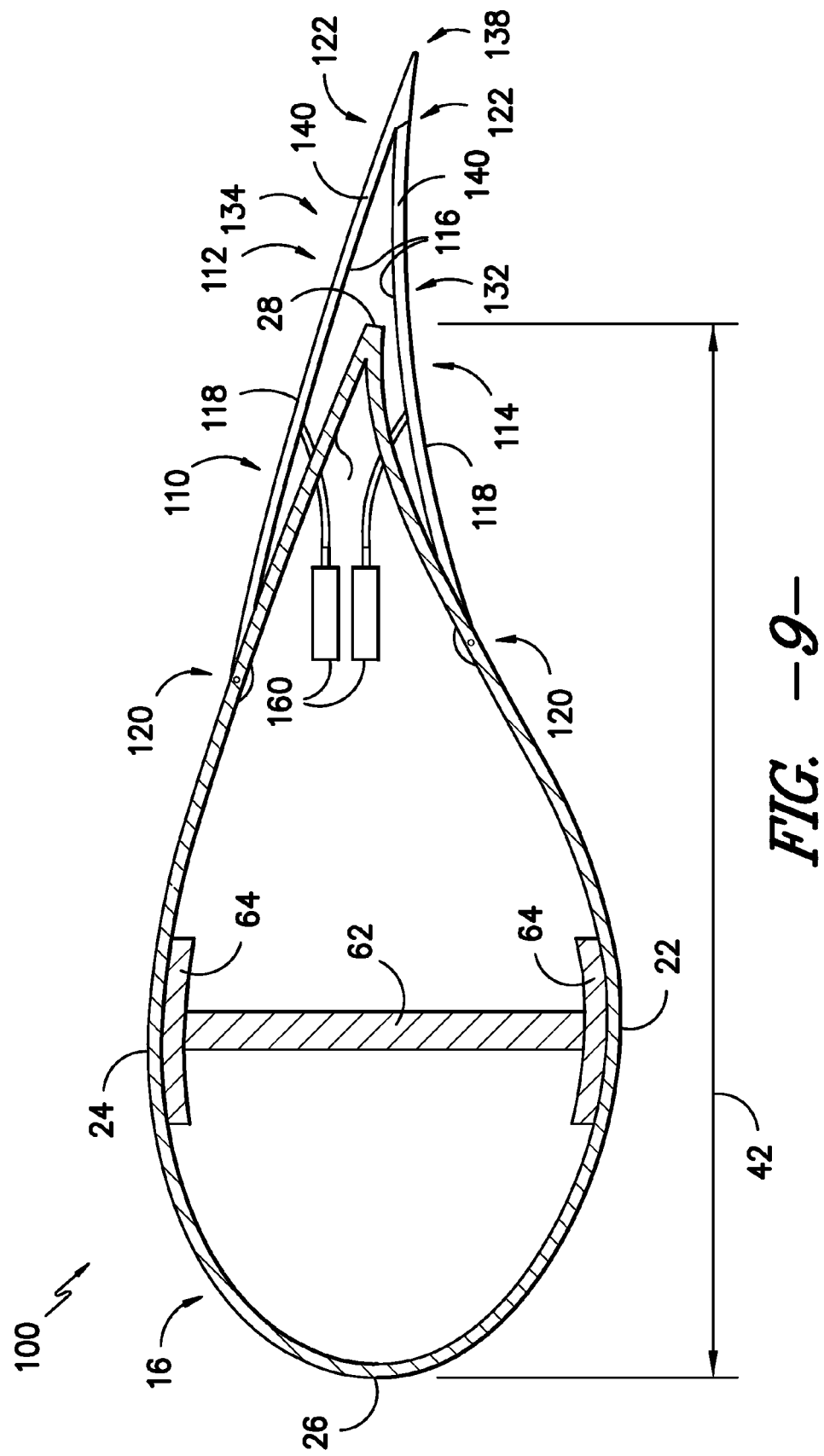
FIG. -9-

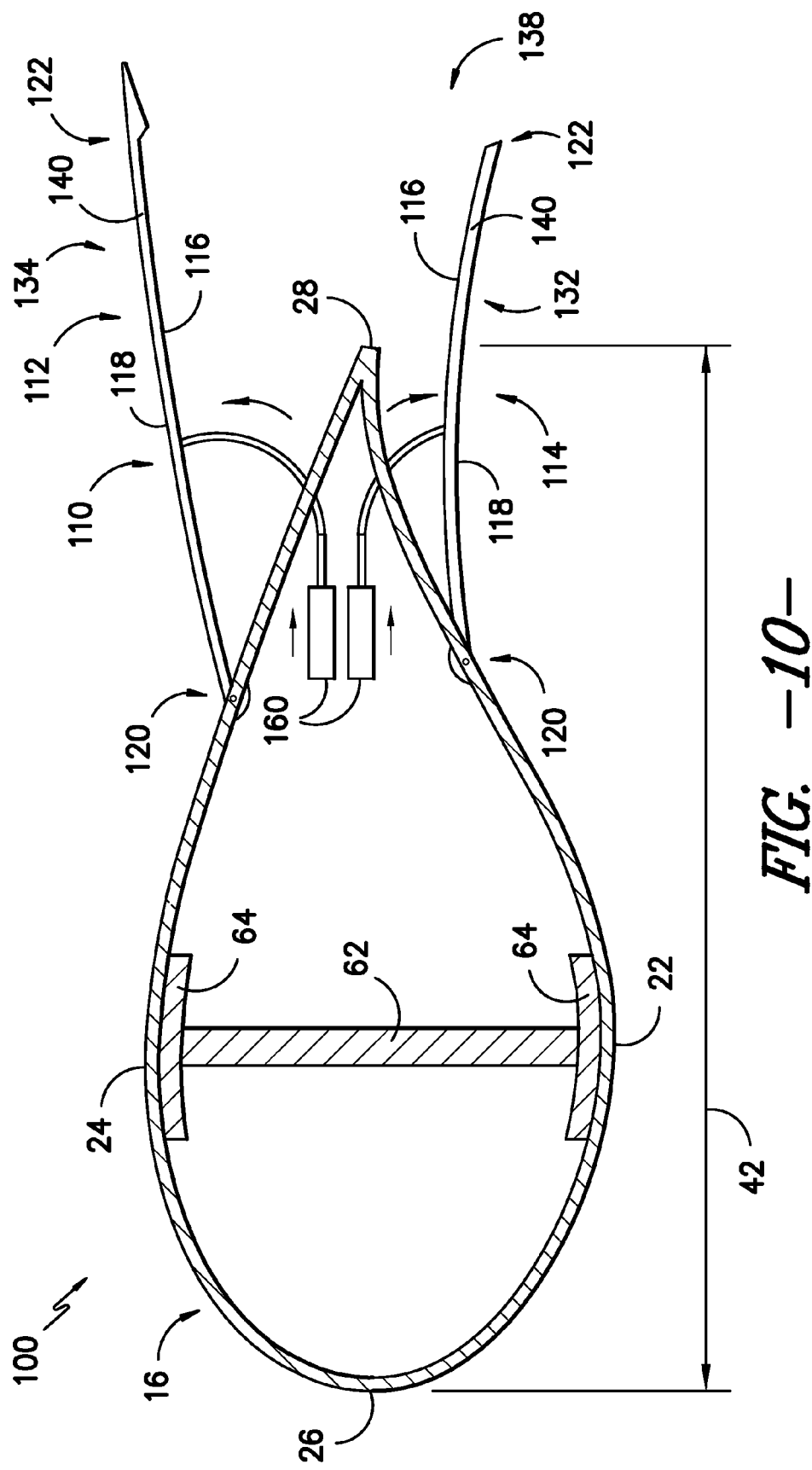

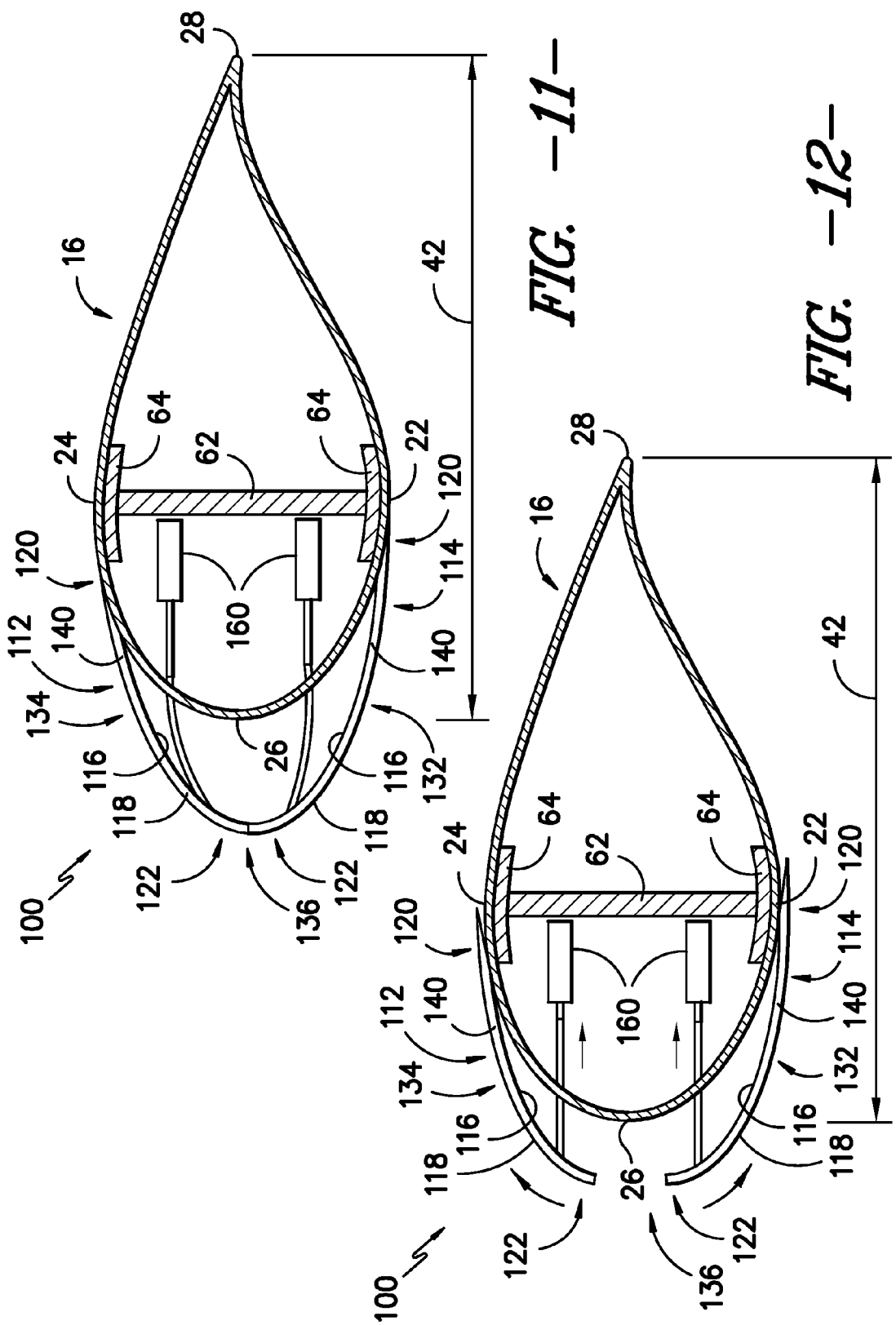

BLADE EXTENSION FOR ROTOR BLADE IN WIND TURBINE

FIELD OF THE INVENTION

The present disclosure relates in general to wind turbine rotor blades, and more particularly to blade extensions for the rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Presently known wind turbine technology has lead to rotor blades that are in general increasing in size, in order to become capable of capturing increased kinetic energy. However, as the size of a rotor blade increases, so does the weight. Such increased weight can negatively impact the performance of a rotor blade and wind turbine in general.

Further, present wind turbine technology has lead to the development of flaps and/or other suitable extensions which may be retrofitted to rotor blades. The extensions are typically formed from solid, one-piece designs, and are mounted on the rotor blades to increase the rotor blade surface area and thus increase the lift. However, such extensions add weight to the rotor blade. As blade extensions increase in size to accommodate increases in rotor blade size, the added weight of the blade extensions can negatively impact the performance of a rotor blade and wind turbine in general.

Additionally, wind turbines typically require braking systems for braking the rotor blades during certain periods in the operation of the wind turbine. However, such braking systems can, especially due to the increasing size of rotor blades, be prohibitively costly and heavy.

Thus, an improved rotor blade assembly would be advantageous. For example, a rotor blade assembly that includes an improved blade extension would be desired in the art. In particular, a rotor blade assembly that includes a blade extension having lightweight features and/or braking features would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly for a wind turbine is disclosed. The rotor blade assembly includes a rotor blade having exterior surfaces defining a pressure side, a suction side, a leading edge, and a trailing edge each extending in a generally span-wise direction between a tip and a root. The rotor blade assembly further includes a blade extension including a first panel and an opposed second panel. Each of the first panel and the second panel includes an interior surface and an exterior surface each extending between a proximal end and a distal end. The distal end of each of the first panel and the second panel is spaced apart from the rotor blade in a generally chord-wise direction in a standard operation position.

In another embodiment, a blade extension for a rotor blade in a wind turbine is disclosed. The blade extension includes a first panel and an opposed second panel. Each of the first panel and the second panel includes an interior surface and an exterior surface each extending between a proximal end and a distal end. The distal end of each of the first panel and the second panel is configured to be spaced apart from the rotor blade in a generally chord-wise direction in a standard operation position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a top perspective view of a rotor blade assembly according to one embodiment of the present disclosure;

FIG. 3 is a top perspective view of a rotor blade assembly according to another embodiment of the present disclosure;

FIG. 4 is a cross-sectional view of a rotor blade assembly according to one embodiment of the present disclosure;

FIG. 5 is a cross-sectional view of a rotor blade assembly according to another embodiment of the present disclosure;

FIG. 6 is a cross-sectional view of a rotor blade assembly according to another embodiment of the present disclosure;

FIG. 7 is a cross-sectional view of a rotor blade assembly in a standard operation position according to one embodiment of the present disclosure;

FIG. 8 is a cross-sectional view of the rotor blade assembly of FIG. 7 in a ancillary position according to one embodiment of the present disclosure;

FIG. 9 is a cross-sectional view of a rotor blade assembly in a standard operation position according to another embodiment of the present disclosure;

FIG. 10 is a cross-sectional view of the rotor blade assembly of FIG. 9 in an ancillary position according to one embodiment of the present disclosure;

FIG. 11 is a cross-sectional view of a rotor blade assembly in a standard operation position according to another embodiment of the present disclosure;

FIG. 12 is a cross-sectional view of the rotor blade assembly of FIG. 11 in an ancillary position according to one embodiment of the present disclosure;

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIGS. 2 through 12, a rotor blade 16 according to the present disclosure may include exterior surfaces defining a pressure side 22, a suction side 24, a leading edge 26, and a trailing edge 28. The pressure side 22 and suction side 24 may each extend between the leading edge 26 and the trailing edge 28. The exterior surfaces may extend between a blade tip 32 and a blade root 34 in a generally span-wise direction, as discussed below.

One or more of the pressure side 22, suction side 24, the leading edge 26 and/or the trailing edge 28 may be generally aerodynamic surfaces having generally aerodynamic contours, as is generally known in the art. For example, FIGS. 4 through 12 illustrate various embodiments of a rotor blade 16 wherein the pressure side 22, suction side 24, the leading edge 26 and the trailing edge 28 have generally aerodynamic surfaces having generally aerodynamic contours and thus forming a typically know airfoil cross-sectional profile.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define a chord 42 and a span 44 extending in chord-wise and span-wise directions, respectively. As shown in FIGS. 2 through 5, the chord 42 may vary throughout the span 44 of the rotor blade 16. Thus, as discussed below, a local chord 46 may be defined for the rotor blade 16 at any point on the rotor blade 16 along the span 44. Further, the rotor blade 16 may define a maximum chord 48, as shown.

Additionally, the rotor blade 16 may define an inner board area 52 and an outer board area 54. The inner board area 52 may be a span-wise portion of the rotor blade 16 extending from the root 34. For example, the inner board area 52 may, in some embodiments, include approximately 33%, 40%, 50%, 60%, 67%, or any percentage or range of percentages therebetween, or any other suitable percentage or range of percentages, of the span 44 from the root 34. The outer board area 54 may be a span-wise portion of the rotor blade 16 extending from the tip 32, and may in some embodiments include the remaining portion of the rotor blade 16 between the inner board area 52 and the tip 32. Additionally or alternatively, the outer board area 54 may, in some embodiments, include approximately 33%, 40%, 50%, 60%, 67%, or any percentage or range of percentages therebetween, or any other suitable percentage or range of percentages, of the span 44 from the tip 32.

One or more structural components may be included within the rotor blade 16 to provide structural support to the rotor blade 16. For example, FIGS. 4 through 12 illustrate a shear web 62 extending between two spar caps 64. The shear web 62 and spar caps 64 may extend through the rotor blade 16 or any portion thereof in the generally span-wise direction. The external surfaces defining the pressure side 22 and suction side 24 may include, or may cover, the spar caps 64.

As illustrated in FIGS. 2 through 12, the present disclosure may further be directed to a rotor blade assembly 100. A rotor blade assembly 100 according to the present disclosure may include a rotor blade 16 and a blade extension 110. The blade extension 110 includes two opposed panels. Each panel 112, 114 includes an interior surface 116 and an exterior surface 118. The panels 112, 114 are opposed, such that the interior surfaces 116 of the panels face each other and the exterior surfaces 118 face away from one another.

Each panel 112, 114 or any portion thereof may, in some embodiments, have a generally aerodynamic contour. For example, the outer surface 118 may have a generally aerodynamic contour. Further, in some embodiments, the outer surface 118 may define a generally continuous aerodynamic surface with an exterior surface, such as the pressure side 22 or suction side 24, of a rotor blade 16. A generally continuous aerodynamic surface is a surface that has a generally continuous aerodynamic contour. Thus, when two surfaces define a generally continuous aerodynamic surface, there is relatively little interruption in the aerodynamic contour at the intersection of the two surfaces. Such continuous aerodynamic contour may particularly occur in embodiments wherein the panels 112, 114 are fixed, and/or in embodiments wherein the panels 112, 114 are movable and in a normal operation position, and/or in embodiments wherein the panels 112, 114 are movable and in an ancillary position, as discussed below.

In other embodiments, the panels 112, 114, such as the exterior surfaces 118 thereof, or any portions thereof, may have any other suitable contours, which may be planer, curviplaner, or otherwise.

As shown, each panel 112, 114 may further extend between a proximal end 120 and a distal end 122. The proximal end 120 may be the end that is mounted to the rotor blade 16 and/or remains relatively closer to the rotor blade 16 when the panel 112, 114 is moved to an ancillary position, as discussed below. The distal end 122 may be the end that is not mounted to the rotor blade 16 and/or remains relatively farther away from the rotor blade 16 when the panel 112, 114 is moved to an ancillary position, as discussed below. The interior surface 116 and exterior surface 118 of each panel 112, 114 may each extend between a proximal end 120 and a distal end 122.

Each panel 112, 114 may further extend through any suitable span-wise portion of the rotor blade 16, and may thus have any suitable length relative to the span 44. For example, a panel 112, 114 may extend from the root 34 towards the tip 32 as shown in FIG. 2. Alternatively, the panel 112, 114 may be spaced from the root 34 as shown in FIG. 3. Further, a panel 112, 114 may be disposed entirely within the inner board area 52 as shown in FIG. 2, within both the inner board area 52 and outer board area 54, or entirely within the outer board area 54 as shown in FIG. 3.

Further, a panel 112, 114 may overlap any suitable portion of a rotor blade 16, as shown in FIGS. 4 through 12. Overlap may be determined based on any suitable cross-sectional profile of the rotor blade 16 at a span-wise location wherein the blade extension 110 is mounted to the rotor blade 16, and may be determined relative to the local chord 46. For example, a panel 112 and/or a panel 114 may overlap approximately 70%, approximately 60%, approximately 50%, approximately 40%, approximately 30%, between approximately 0% and approximately 70%, between approximately 0% and approximately 60%, between approximately 0% and approximately 50%, or between approximately 0% and approximately 40%, or any other suitable percentage, range, or sub-range thereof, of the local chord 46.

In some embodiments, as shown in FIGS. 4 through 10, the proximal end 120 of a panel 112, 114 may be mounted to the rotor blade 16, such as to an exterior surface thereof. The proximal end 120 may in some embodiments be mounted through the use of, for example, a suitable adhesive or a suitable brazing or welding technique, or may be mounted through the use of, for example, suitable mechanical fasteners such as screws, nails, rivets, nut-bolt combinations, etc. In these embodiments, the panel 112, 114 may be fixed with respect to the rotor blade 16, as discussed below and shown in FIGS. 4 through 6. In other embodiments, the proximal end 120 may be mounted through the use of a pin or other suitable device or apparatus that allows the panel 112, 114 to move, such as rotate, with respect to the rotor blade 16, as discussed below and shown in FIGS. 7 through 10. In still other embodiments, the proximal end 120 may be free from, and not mounted to, the rotor blade 16, such that the panel 112, 114 may move, such as slide, with respect to the rotor blade 16, as discussed below and shown in FIGS. 11 and 12.

As mentioned, the proximal end 120 of a panel 112, 114 may in some embodiments be mounted to the rotor blade 16, such as to an exterior surface thereof. For example, the first panel 112 may be mounted to the suction side 24 as shown in FIGS. 4 through 11, or may be mounted to the pressure side 22, leading edge 26, or trailing edge 28. The second panel 114 may be mounted to the trailing edge 28 as shown in FIGS. 4 and 7 through 8, the pressure side 22 as shown in FIGS. 5, 6, 9, and 10, or may be mounted to the suction side 24 or leading edge 26.

The distal end 122 of a panel 112, 114 may be spaced apart from the rotor blade 16 when the panel is in a standard operation position. For example, as shown in FIGS. 4 through 7, 9 and 11, the distal end 122 may be spaced apart in the generally chord-wise direction (along the chord 42 or local chord 46). The standard operation position may be the fixed position, or may be a standard operation position for a movable panel 112, 114, discussed below. The distal end 122 may in some embodiments remain spaced from the rotor blade 16 when in an ancillary position, as shown in FIGS. 8, 10, and 12, or may be in alignment with the rotor blade 16 in the chord-wise direction when in the ancillary position, discussed below.

As shown, a blade extension 110 according to the present disclosure, such as the first panel 112 and second panel 114 thereof, may provide and define extended exterior surfaces for the rotor blade 16. For example, as shown in FIGS. 4 through 12, the exterior surface 118 of the first panel 112 may define an extended suction side 134, and the exterior surface 118 of the second panel 114 may provide an extended pressure side 132. By extending the pressure side 22 and suction side 24 of the rotor blade 16, the blade extension 110 may augment the lift capacity, reduce the drag, and/or augment the lift to drag ratio of the rotor blade 16 when in a fixed or standard operation position.

Additionally, in some embodiments as shown in FIGS. 4 through 10, the blade extension 110, such as the first panel 112 and second panel 114 thereof, may define an extended trailing edge 138. Thus, the panels 112, 114 may in these embodiments be spaced from the leading edge 26 in the chord-wise direction. One or both of the panels 112, 114 may still, however, overlap a portion of the rotor blade 16. In other embodiments as shown in FIGS. 11 through 12, the blade extension 110, such as the first panel 112 and second panel 114 thereof, may define an extended leading edge 136. Thus, the panels 112, 114 may in these embodiments be spaced from the trailing edge 28 in the chord-wise direction. One or both of the panels 112, 114 may still, however, overlap a portion of the rotor blade 16.

Each panel 112, 114 of a blade extension 110 according to the present disclosure may be formed from any suitable materials. In some embodiments, for example, a panel 112, 114 may include a core 140, as shown in FIGS. 4 through 12. Further, in some embodiments, a panel 112, 114 may include a cover 142, as shown in FIG. 4. The cover 142 may enclose at least a portion of the core 140, and may thus form the interior surface 116 and/or exterior surface 118 of a panel 112, 114, as shown. The core 140 of a panel 112, 114 may be formed from, for example, carbon fiber, fiberglass, hardened foam, or any other suitable material. The material utilized to form a core 140 may preferably be lightweight, and may further preferably be suitably rigid to maintain its structure during use in a wind turbine 10. The cover 142 of a panel 112, 114 may be formed from fiberglass, aluminum, fabric, or any other suitable material. The fabric may, in some embodiments, be "doped" or treated such that it is suitably rigid. Similar to the core 140, the material utilized to form a cover 142 may preferably be lightweight, and may further preferably be suitably rigid to maintain its structure during use in a wind turbine 10.

In some embodiments, as shown in FIG. 4, each of the first panel 112 and second panel 114 may include a cover 142. Further, in some embodiments as shown, the covers 142 of the panel 112, 114 may be connected, thus forming a single integral cover 142. The integral cover 142 may extend between the first panel 112 and second panel 114 at any suitable location along the panels 112, 114. For example, in some embodiments, the cover 142 extends between the distal end 122 of the first panel 112 and the distal end 122 of the second panel 114, and may thus form the extended trailing edge 138 as shown in FIG. 4 or the extended leading edge 136. In other embodiments, however, the covers 142 of the first panel 112 and second panel 114 may be separate from each other.

As further shown in FIG. 4, a spring 144 may be connected between the cover 142 and a surface of the rotor blade 16, such as the pressure side 22, suction side 24, leading edge 26, or trailing edge 28. The spring 144 may provide a tensioning force to the cover 142, to ensure that the cover 142 remains taught during operation of the wind turbine 100. Additionally, in embodiments wherein the blade extension 110 is movable as discussed herein, the spring 144 may stretch and compress as required to maintain the taughtness of the cover 142.

In some embodiments, as shown in FIGS. 5 and 6, one or more structural members may be included in a blade extension 110. The structural members may be mounted one or both panels 112, 114 and/or to the rotor blade 16 to provide structural support to and between the panels 112, 114. A structural member may thus extend between and connect the first panel 112 and second panel 114, or may extend between and connect one of the panels 112, 114 and an external surface of the rotor blade 16. Structural members may be, for example, rods, wedges, or webs, as discussed below, or any other suitable members that provide structural support.

For example, in some embodiments as shown in FIG. 5, a blade extension 110 may include one or more rods 152 and/or one or more wedges 154. A rod 152 may extend at any suitable direction and at any suitable location between the first panel 112 and second panel 114 or between one of the panels 112, 114 and an external surface of the rotor blade 16. In some embodiments, a rod 152 extending between the first panel 112 and second panel 114 may be located at or adjacent to the distal ends 122 of the panels 112, 114, to provide structural support for the distal ends 122. Further, in some embodiments, a plurality of rods 152 may be disposed and spaced apart along the span 44 of the rotor blade 16 or any portion thereof. A wedge 154 may extend at any suitable direction and at any suitable location between one of the panels 112, 114 and an external surface of the rotor blade 16. A wedge 154 may extend along a suitable portion of the span 44 of the rotor blade 16, and/or a plurality of wedges 154 may be disposed and spaced apart along the span 44 of the rotor blade 16 or any portion thereof.

In other embodiments as shown in FIG. 6, a blade extension 110 may include a web 156. A web 156 may extend at any suitable direction and at any suitable location between the first panel 112 and second panel 114 or between one of the panels 112, 114 and an external surface of the rotor blade 16. In some embodiments, a web 156 extending between the first panel 112 and second panel 114 may be located at or adjacent to the distal ends 122 of the panels 112, 114, to provide structural support for the distal ends 122. A web 156 may extend along a suitable portion of the span 44 of the rotor blade 16, and/or a plurality of webs 156 may be disposed and spaced apart along the span 44 of the rotor blade 16 or any portion thereof.

As discussed above, in some embodiments one or both of the first panel 112 and the second panel 114 may be fixed, while in other embodiments one or both of the first panel 112 and the second panel 114 may be movable. For example, FIGS. 4 through 6 illustrate various embodiments wherein the first panel 112 and second panel 114 are fixed. When a panel 112, 114 is fixed, it does not move relative to the rotor blade 16 other than due to external forces during operation of the wind turbine 10. Further, a panel 112, 114 according to the present disclosure may be fixed in a standard operation position, as discussed below.

FIGS. 7 through 12 illustrate various embodiments wherein the first panel 112 and second panel 114 are movable relative to the rotor blade 16. In general, a movable panel 112, 114 may be movable between a standard operation position, as shown in FIGS. 7, 9 and 11, and an ancillary position, as shown in FIGS. 8, 10, and 12. A standard operation position is a position that a panel 112, 114 may be in during normal operation of the wind turbine. Such position may allow the panel 112, 114 to, for example, augment the lift capacity, reduce the drag, and/or augment the lift to drag ratio of the rotor blade 16 or provide another suitable benefit to the rotor blade 16 during normal operation. An ancillary position is a position that a panel 112, 114 may be in during specified periods outside of normal operation of the wind turbine 16. For example, an ancillary position may be a load shedding position, and a panel 112, 114 may be put in this position during periods of increased loading, or an ancillary position may be a braking position, and a panel 112, 114 may be put in this position during braking of a wind turbine 10.

FIGS. 7 through 10 illustrate embodiments of movable panels 112, 114 wherein the panels 112, 114 are pivotable. In these embodiments, the proximal end 120 of a panel 112, 114 may be pivotally mounted to the rotor blade 16, and the distal end 122 may pivot with respect to the proximal end 120. Each panel 112, 114 may pivot in a direction from the pressure side 22 towards the suction side 24, as shown by both panels 112, 114 in FIGS. 7 and 8 and the first panel 112 in FIGS. 9 and 10, or may pivot in a direction from the suction side 24 towards the pressure side 22, as shown by the second panel in FIGS. 9 and 10.

FIGS. 11 and 12 illustrate embodiments of movable panels 112, 114 wherein the panels 112, 114 are slidable. In these embodiments, the proximal end 120 and distal end 122 are both free from the rotor blade 16, and the panel 112, 114 may slide relative to the rotor blade 16. For example, in the embodiment shown, each panel 112, 114 may slide relative to the rotor blade 16 in the generally chord-wise direction over the respective suction side 24 and pressure side 22.

As shown in FIGS. 7 through 12, one or more actuators 160 may be included in the blade extension 110. Each actuator 160 may be connected to a panel 112, 114, and may be actuable to move the panel 112, 114 between a standard operation position and an ancillary position. An actuator may be a pneumatic cylinder, a hydraulic cylinder, a gearbox, or any other suitable device that is actuable to move a panel 112, 114.

Thus, the present disclosure is advantageously directed to a blade extension 110 and a rotor blade assembly 100 having improved features. For example, a blade extension 110 having a first panel 112 and a second panel 114 as discussed above may reduce the weight associated with similarly sized and previously known blade extensions 110, while providing similar lift augmentation, drag reduction, and/or lift to drag ratio augmentation and/or other beneficial features to rotor blades 16. Such blade extensions 110 may further be retrofitted to existing rotor blade 16, as shown in FIGS. 2 though 12, or may be utilized in newly manufactured rotor blades 16. Such blade extensions 110 may further, in some embodiments, include advantageously braking and/or load shedding features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
   a rotor blade having exterior surfaces defining a pressure side, a suction side, a leading edge, and a trailing edge each extending hi a generally span-wise direction between a tip and a root; and,
   a blade extension comprising a first panel and an opposed second panel, each of the first panel and the second panel comprising an interior surface and an exterior surface each extending between a proximal end and a distal end, each of the first panel and the second panel further comprising a core and a cover, the cover comprising the interior surface and the exterior surface, the distal end of each of the first panel and the second panel spaced apart from the rotor blade in a generally chord-wise direction in a standard operation position.

2. The rotor blade assembly of claim 1, wherein the blade extension defines an extended trailing edge.

3. The rotor blade assembly of claim 1, wherein the blade extension defines an extended leading edge.

4. The rotor blade assembly of claim 1, wherein the cover of the first panel and the cover of the second panel are integral with each other, and wherein the integral cover extends between the distal end of the first panel and the distal end of the second panel.

5. The rotor blade assembly of claim 1, further comprising a structural member extending between and connecting the first panel and the second panel.

6. The rotor blade assembly of claim 1, wherein the proximal end of the first panel is mounted to the suction side of the rotor blade, and the proximal end of the second panel is mounted to the trailing edge of the rotor blade.

7. The rotor blade assembly of claim 1, wherein the proximal end of the first panel is mounted to the suction side of the rotor blade, and the proximal end of the second panel is mounted to the pressure side of the rotor blade.

8. The rotor blade assembly of claim 1, wherein at least one of the first panel or the second panel is fixed.

9. The rotor blade assembly of claim 1, wherein at least one of the first panel or the second panel is movable.

10. The rotor blade assembly of claim 9, wherein the at least one of the first panel or the second panel is pivotable.

11. A blade extension for a rotor blade in a wind turbine, the blade extension comprising:
   a first panel and an opposed second panel, each of the first panel and the second panel comprising an interior surface and an exterior surface each extending between a proximal end and a distal end, each of the first panel and the second panel further comprising a core and a cover, the cover comprising the interior surface and the exterior surface, the distal end of each of the first panel and the second panel configured to be spaced apart from the rotor blade in a generally chord-wise direction in a standard operation position.

12. A rotor blade assembly for a wind turbine, the rotor blade assembly comprising:
   a rotor blade having exterior surfaces defining a pressure side, a suction side, a leading edge, and a trailing edge each extending in a generally span-wise direction between a tip and a root; and,
   a blade extension comprising a first panel and an opposed second panel, each of the first panel and the second panel comprising an interior surface and an exterior surface each extending between a proximal end and a distal end, the distal end of each of the first panel and the second panel spaced apart from the rotor blade in a generally chord-wise direction in a standard operation position, the proximal end of the first panel mounted to the suction side of the rotor blade, the proximal end of the second panel mounted to the trailing edge of the rotor blade.

13. The rotor blade assembly of claim 12, wherein the blade extension defines an extended trailing edge.

14. The rotor blade assembly of claim 12, wherein each of the first panel and the second panel comprises a core and a cover, the cover comprising the interior surface and the exterior surface, wherein the cover of the first panel and the cover of the second panel are integral with each other, and wherein the integral cover extends between the distal end of the first panel and the distal end of the second panel.

15. The rotor blade assembly of claim 12, further comprising a structural member extending between and connecting the first panel and the second panel.

16. The rotor blade assembly of claim 12, wherein at least one of the first panel or the second panel is fixed.

17. The rotor blade assembly of claim 12, wherein at least one of the first panel or the second panel is movable.

18. The rotor blade assembly of claim 17, wherein the at least one of the first panel or the second panel is pivotable.

* * * * *

UNITED STATES PATENT AND TRADEMARK OFFICE
CERTIFICATE OF CORRECTION

| | | |
|---|---|---|
| PATENT NO. | : 8,376,703 B2 | Page 1 of 1 |
| APPLICATION NO. | : 13/300868 | |
| DATED | : February 19, 2013 | |
| INVENTOR(S) | : Christian A. Carroll et al. | |

It is certified that error appears in the above-identified patent and that said Letters Patent is hereby corrected as shown below:

In The Claims
Column 9, line 6, "hi" should read "in"

Signed and Sealed this
Nineteenth Day of April, 2016

Michelle K. Lee
*Director of the United States Patent and Trademark Office*